US009470782B2

(12) United States Patent
Millar et al.

(10) Patent No.: US 9,470,782 B2
(45) Date of Patent: Oct. 18, 2016

(54) METHOD AND APPARATUS FOR INCREASING ANGULAR RESOLUTION IN AN AUTOMOTIVE RADAR SYSTEM

(71) Applicant: Valeo Radar Systems, Inc., Hudson, NH (US)

(72) Inventors: Jeffrey Millar, Mont Vernon, NH (US); Joseph S. Pleva, Londonderry, NH (US)

(73) Assignee: VALEO RADAR SYSTEMS, INC., Hudson, NH (US)

( * ) Notice: Subject to any disclaimer, the term of this patent is extended or adjusted under 35 U.S.C. 154(b) by 86 days.

(21) Appl. No.: 14/554,224

(22) Filed: Nov. 26, 2014

(65) Prior Publication Data

US 2016/0146932 A1 May 26, 2016

(51) Int. Cl.
| | |
|---|---|
| *G01S 13/02* | (2006.01) |
| *G01S 7/02* | (2006.01) |
| *G01S 7/03* | (2006.01) |
| *G01S 7/35* | (2006.01) |
| *G01S 13/44* | (2006.01) |
| *G01S 13/93* | (2006.01) |
| *G01S 13/34* | (2006.01) |

(52) U.S. Cl.
CPC .......... *G01S 13/02* (2013.01); *G01S 7/02* (2013.01); *G01S 7/03* (2013.01); *G01S 7/352* (2013.01); *G01S 13/4454* (2013.01); *G01S 13/931* (2013.01); *G01S 13/345* (2013.01)

(58) Field of Classification Search
CPC ...... G01S 13/02; G01S 7/02; G01S 13/9023; G01S 13/9029; G01S 3/14; G01S 3/46
USPC ..................... 342/175, 156, 70–72
See application file for complete search history.

(56) References Cited

U.S. PATENT DOCUMENTS

| | | | |
|---|---|---|---|
| 3,952,303 A | 4/1976 | Watanabe et al. | |
| 4,825,213 A * | 4/1989 | Smrek ................ | G01S 13/9029 342/161 |
| 5,334,984 A * | 8/1994 | Akaba ................ | G01S 3/10 342/148 |
| 5,579,011 A * | 11/1996 | Smrek ................ | G01S 13/9029 342/113 |
| 6,337,656 B1 * | 1/2002 | Natsume ............. | G01S 13/44 342/149 |
| 6,366,236 B1 | 4/2002 | Farmer et al. | |
| 6,577,269 B2 | 6/2003 | Woodington et al. | |
| 7,265,675 B1 | 9/2007 | Carrender et al. | |
| 7,379,018 B1 | 5/2008 | Lohmeier et al. | |
| 8,054,216 B2 | 11/2011 | Kinoshita et al. | |
| 9,229,102 B1 * | 1/2016 | Wright ............... | G01S 13/888 |
| 2005/0156780 A1 | 7/2005 | Bonthron et al. | |
| 2008/0018523 A1 | 1/2008 | Kelly, Jr. et al. | |
| 2010/0271258 A1 | 10/2010 | Takabayashi et al. | |

(Continued)

FOREIGN PATENT DOCUMENTS

| | | |
|---|---|---|
| DE | 10 2012 021 212 A1 | 4/2014 |
| EP | 0 766 100 A1 | 4/1997 |
| GB | 2462148 A | 2/2010 |

OTHER PUBLICATIONS

PCT International Search Report and Written Opinion dated Mar. 3, 2016 corresponding to PCT International Application No. PCT/US2015/062378; 12 Pages.

*Primary Examiner* — John B Sotomayor
(74) *Attorney, Agent, or Firm* — Daly, Crowley, Mofford & Durkee, LLP

(57) ABSTRACT

Described herein is an automotive radar system which utilizes a three channel switched antenna to improve the angular resolution of an azimuth tracking two-channel, radar.

10 Claims, 6 Drawing Sheets

(56) References Cited

U.S. PATENT DOCUMENTS

| | | |
|---|---|---|
| 2012/0313811 A1 | 12/2012 | Suzuki |
| 2015/0070207 A1 | 3/2015 | Millar et al. |
| 2015/0323660 A1 | 11/2015 | Hampikian |
| 2016/0033620 A1 | 2/2016 | Millar |
| 2016/0061947 A1 | 3/2016 | Patole et al. |
| 2016/0146925 A1 | 5/2016 | Millar |
| 2016/0146932 A1* | 5/2016 | Millar .................... G01S 13/02 342/175 |

* cited by examiner

METHOD AND APPARATUS FOR INCREASING ANGULAR RESOLUTION IN AN AUTOMOTIVE RADAR SYSTEM

FIELD

The concepts, systems, circuits, devices and techniques described herein relate generally to radio frequency (RF) circuits and more particularly to automotive radar systems.

BACKGROUND

As is known in the art, some existing automotive radar systems detect targets which produce a radar return signal having a signal strength which exceeds a threshold signal strength in range/Doppler space. The radar then develops an estimate of X-Y position and velocity for each target. This approach typically requires algorithms in the form of state machines and tracking with thresholds and heuristics.

Referring to FIGS. 1-1A, some conventional automotive radar systems use two antennas, each feeding one channel of a two-channel receiver. As illustrated in FIG. 1A, the phase difference between the signals in the two channels provides angle information which can be used to detect targets in an azimuth plane. An antenna spacing of one-half wavelength ($\lambda/2$) theoretically enables such a two-channel automotive radar system to provide unambiguous angle information over a 180° field of view (FOV).

SUMMARY

Some automotive radar systems, however, use relatively small and inexpensive antennas and other components. This is due both to cost considerations and size constraints. Such constraints in the antenna lead to a problem with antenna quality and antenna interaction with a body of a vehicle on which an automotive radar system is mounted. In particular, and in accordance with the concepts, systems and techniques described herein, it has been recognized that the use of relatively small and inexpensive antennas results in a complex phase relationship between azimuth and phase difference in an automotive radar system.

It has also been recognized that conventional two-channel automotive radar systems (also referred to as two channel automotive "sensor" systems) generate ambiguities which cannot be easily resolved. Specifically, as illustrated in FIG. 1B, the limitations of conventional two-channel automotive radar systems (i.e. utilizing two antennas spaced by $\lambda/2$ with each antenna feeding one channel of a 2-channel receiver) in real world applications become clear. In real world applications in a conventional two-channel automotive radar system, interactions of radio frequency (RF) energy with the antenna surroundings results in ripple in a phase response of the automotive radar system. Automotive fascia, brackets, vehicle body and other structure and factors all can contribute to such phase ripple. Furthermore the radar's small size contributes to phase distortion due to the edge of the antenna and radar enclosure occurring at locations having significant RF energy. Thus, as illustrated in FIG. 1B, a resulting phase curve in a real world system has regions (e.g., between approximately 50 and 60 degrees in FIG. 1B) were the angular resolution is such that ambiguities exist and thus the angular resolution is not acceptable.

In accordance with one aspect of the concepts, systems and techniques described herein, it has been found that the above problem may be solved in a two-channel automotive radar system by adding a third antenna. Thus, described herein is an automotive radar system which utilizes a three channel switched antenna to improve the angular resolution of an azimuth tracking two-channel automotive radar system having a wide (i.e. field of view greater than above approximately 145 or 150 degrees). It should, of course, be appreciated that the concepts and techniques described herein also find application in systems having a narrow field of view (FOV)—i.e. a FOV less than approximately 150 degrees— although a narrow field of view requirement might allow an antenna design having attenuated RF energy propagating at 0 and 180 degrees and thus reduce the number and severity of problems when RF the energy interacts with a structure proximate the antenna including, but not limited to, for example an edge of the antenna board, an enclosure frame, and/or a vehicle body.

Specifically, in a two-channel automotive radar system, a first antenna is spaced from a second antenna by a distance of $\lambda/2$ and a third antenna is spaced from the second antenna by a distance of $\lambda$ and is spaced from the first antenna by a distance of $3\lambda/2$. The first antenna is coupled to a first channel of the two-channel receiver and the second and third antennas (with the second antenna spaced $\lambda/2$ from the first antenna and the third antenna being spaced $3\lambda/2$ from the first antenna) are selectively coupled to the second receiver channel through a switch. Thus, signals received from two separate antennas share one channel of the two-channel receiver.

With this particular arrangement, a two-channel automotive radar system having an angular resolution which does not result in ambiguities is provided. In particular, by providing a two-channel automotive radar system having three appropriately spaced antennas and with two of the antennas selectively sharing a single channel, the two-channel automotive radar system can generate two (2) different phase curves with a first one of the phase curves corresponding to an unambiguous phase curve (substantially the same as that provided in a conventional two-channel system with $\lambda/2$ antenna spacing) and a second one of the two phase curves corresponding to a phase curve having a slope which is different than the slope of the first phase curve (e.g. a phase curve generated by using $\lambda/2$ antenna spacing).

The advantages to using such a system include, but are not limited to: (1) that the $3\lambda/2$ phase curve has higher azimuth angle resolution; (2) the $\lambda/2$ phase curve is used to resolve the ambiguities in the $3\lambda/2$ phase curve; (3) the system of less sensitive to placement and mounting (lower effective ripple); and (4) the system provided better field of view (FOV) performance.

In accordance with a further aspect of the concepts, systems and techniques described herein, an automotive radar system comprises three receive antennas with a first antenna is spaced from a second antenna by a distance of $\lambda/2$ and a third antenna is spaced from the second antenna by a distance of $\lambda$ and spaced from the first antenna by a distance of $3\lambda/2$. Each of the three antenna are coupled to one of three channels in a radio frequency (RF) receiver. Thus, each receiver channel has an input coupled to a respective one of three antennas.

With this particular arrangement, a three-channel automotive radar system is provided having an angular resolution which does not result in ambiguities. In particular, by providing a three-channel automotive radar system having three appropriately spaced antennas, the three-channel automotive radar system can generate two (2) different phase curves with a first one of the phase curves corresponding to an unambiguous phase curve (substantially the same as that provided in a conventional two-channel system with $\lambda/2$ antenna spacing) and a second one of the two phase curves corresponding to a phase curve having a slope which is different than the slope of the first phase curve (e.g. a phase curve generated by using 3λ/2 antenna spacing).

The advantages to using such a system include, but are not limited to: (1) that the 3λ/2 phase curve has higher azimuth angle resolution; (2) the λ/2 phase curve is used to resolve the ambiguities in the 3λ/2 phase curve; (3) the system is less sensitive to placement and mounting (lower effective ripple); and (4) the system provides better field of view (FOV) performance because the radar has less need to attenuate energy towards the 0 and 180 degree directions.

The concepts, structures and techniques described herein can benefit any 24 GHz radar, especially those using wide field of view (FOV) antenna designs. Furthermore, the concepts, structures and techniques described herein can be used in a wide variety of applications including, but not limited to blind spot detection, lane change, CTA, and park slot measurement.

It should be noted that individual concepts, features (or elements) and techniques of different embodiments described above may be combined to form other embodiments not specifically set forth herein. Furthermore, various concepts, features (or elements) and techniques, which are described in a combination, may also be provided separately or in any suitable sub-combination. It is thus expected that other embodiments not specifically described herein are also within the scope of this disclosure.

BRIEF DESCRIPTION OF THE DRAWINGS

The foregoing and other aspects, features and advantages of the concepts described herein will be apparent from the following description of particular embodiments, as illustrated in the accompanying drawings in which like reference characters refer to the same parts throughout the different views. The drawings are not necessarily to scale, emphasis instead being placed upon illustrating the principles of the invention.

DETAILED DESCRIPTION

Described herein is an automotive radar system (also sometime referred to herein as an automotive sensor system) and techniques suitable for providing unambiguous phase information for locating a target. The techniques described herein are suitable for use with a frequency modulated continuous wave (FMCW) automotive radar system, however, it should be appreciated that the systems and techniques described herein also may be used in non-FMCW automotive radars as well as in radars other than automotive radars.

Figure 2:
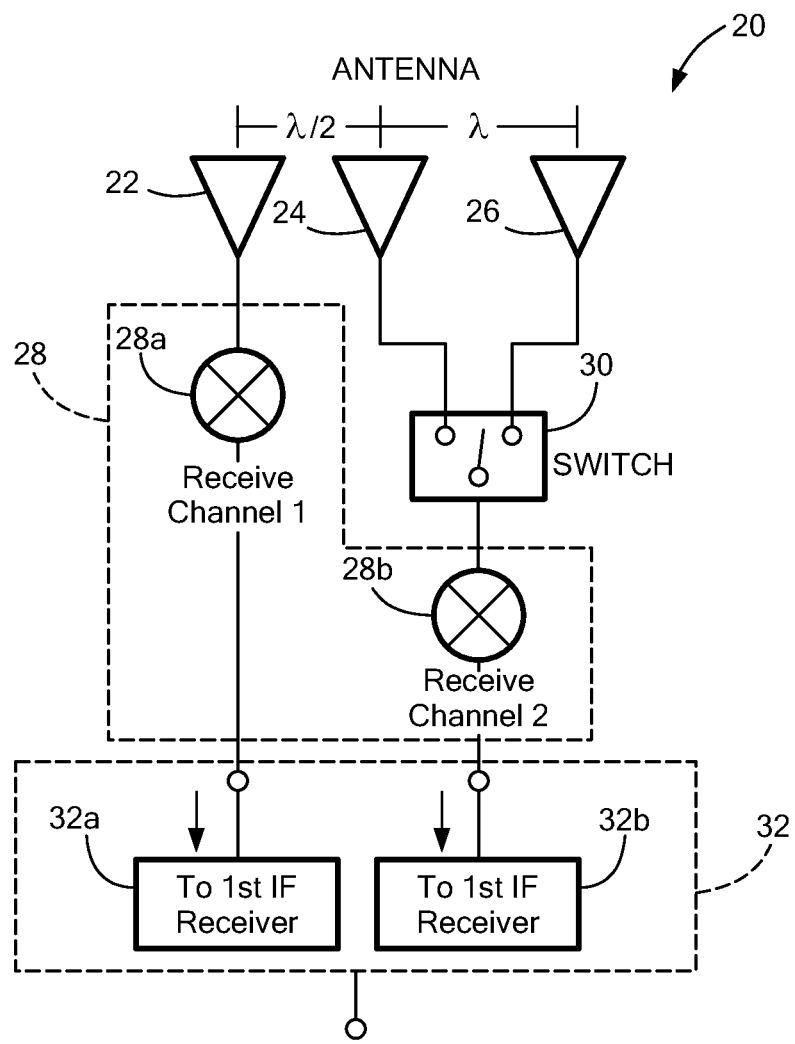
FIG. 2 is a block diagram of an automotive radar system which utilizes a three channel switched antenna.

Referring now to FIG. 2, an automotive radar system 20 which utilizes a three channel switched antenna to improve the angular resolution of an azimuth tracking two-channel automotive radar system includes a first antenna 22 spaced from a second antenna 24 by a distance of λ/2 and a third antenna 26 spaced from the second antenna 24 by a distance of λ and spaced from the first antenna by a distance of 3λ/2. The first antenna 22 is coupled to a first radio frequency (RF) receiver channel 26a of a two-channel RF receiver 26. In the example system of FIG. 2, receiver channel 26a is illustrated as a single RF downconverter. Those of ordinary skill in the art will appreciate, of course, that receiver channel 26a may include a significant number of other components as is generally known (e.g. a low noise amplifier).

The second and third antennas 24, 26 are selectively coupled to the second receiver channel 26b through an RF switch 28. Thus, in the example system of FIG. 2, signals received from two separate antennas (i.e. antennas 24, 26) share one channel (i.e. channel 26b) of the two-channel receiver 26.

As noted above, those of ordinary skill in the art will appreciate that receiver channel 26b may include a significant number of other components as is generally known (e.g. a low noise amplifier). It should also be appreciated that switch 30 is not shown as being a proper part of RF receiver 28. After reading the description provided herein, however, those of ordinary skill in the art will appreciate that switch 30 may be provided as a component separate from receiver 28 or may be provided as part of receiver 28. Furthermore, in some applications, switch 30 may even be provided as part of the RF receiver channel 28b.

Receiver channels 28a, 28b, receive RF signals provide thereto from respective ones of antennas 22-26 and downconvert the signals to a first intermediate frequency for further processing by respective ones of intermediate frequency (IF) receiver channels 32a, 32b.

Significantly, processing of the RF signals through receiver channels 28a, 28b and switch 30 retains the relative phase information associated with the signals received through the respective antennas 22-26. The preferred results are achieved when ambiguity resolution of 3λ/2 is done when the scene is the same as when measured by the λ/2 spacing. So preferred designs use alternating λ/2 and 3λ/2 spacing as rapidly as possible. The switching frequency is selected to provide the most up to date ambiguity timing of ambiguity resolution. In an automotive radar system utilizing major and minor processing cycles such as that described in U.S. Pat. No. 6,707,419 B2 assigned to the assignee of the present application and incorporated herein by reference, for a 40 millisecond (ms) major cycle, 80 ms is used for each 3λ/2 antenna, and 80 ms for each λ/2 antenna.

IF receivers 32a, 32b process the signals fed thereto from respective RF receiver channels 28a, 28b. Such processing may include conversion of analog signals to digital signals.

As noted above, RF receiver channel 32b receives signals from both antenna 24 and antenna 26. Since the spacing between antenna 22 and antenna 24 is different than the spacing between antenna 22 and antenna 26, by switching between the two antennas, the system generates two (2) different phase curves.

A phase curve is the measured relationship between measured phase difference and actual azimuth angle. Each antenna pair (e.g. antennas 22, 24 as a pair or antennas 22, 26 as a pair) has a unique relationship or phase curve. Assuming a 40 ms major cycle time and a relatively stationary radar scene over 80 ms, for example, one phase curve can be used to resolve the ambiguity of the other. Both phase difference measurements have useful information about the target. The relationship between signal to noise ratio and azimuth error can be used to weight the contribution of the $\lambda/2$ phase curve to the net azimuth estimate.

Figure 2A:
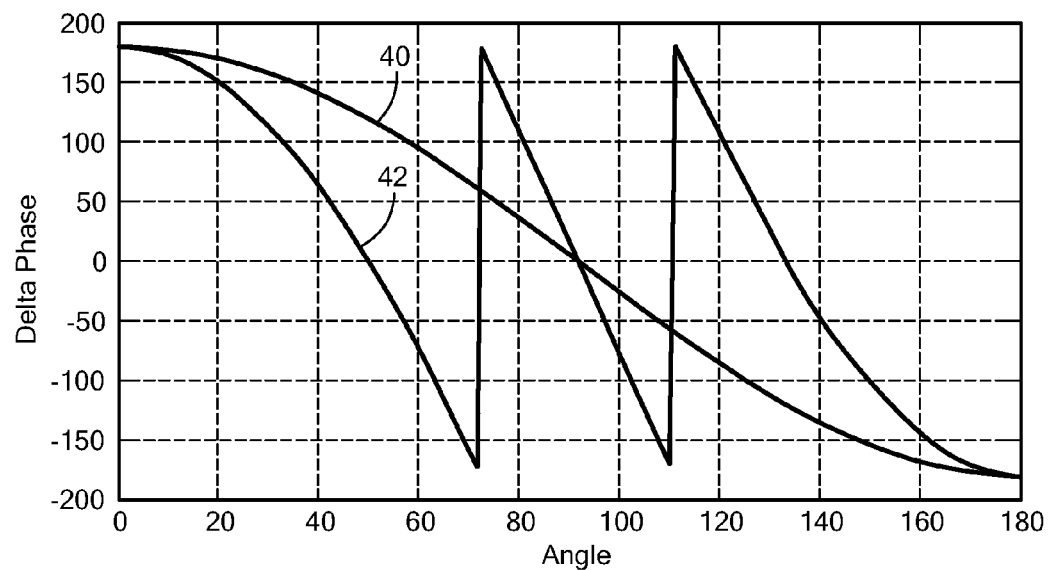
FIG. 2A is plot of ideal phase difference vs. angle for an automotive radar system which utilizes a three channel switched antenna which may be the same as or similar to the system described in conjunction with FIG. 2.

Regardless of whether analog processing, digital processing or a combination of analog and digital processing is used, however, such processing in receiver 32 generates two (2) different phase curves such as those illustrated in FIG. 2A. It should be appreciated that in some applications utilizing four (4) or more antennas, for example, it may be advantageous to utilize more than two phase curves. For example, it may be desirable for an automotive radar system to utilize four (4) antennas with simultaneous processing with three or more phase curves.

Figure 1:
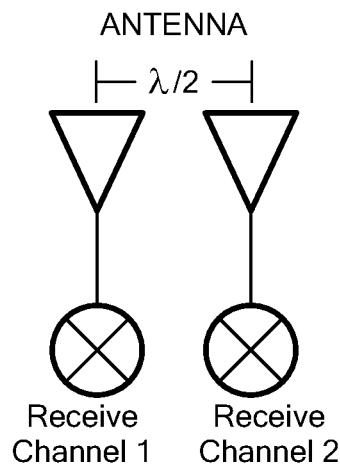
FIG. 1 is a block diagram of a prior art two-channel automotive radar system.
Figure 1A:
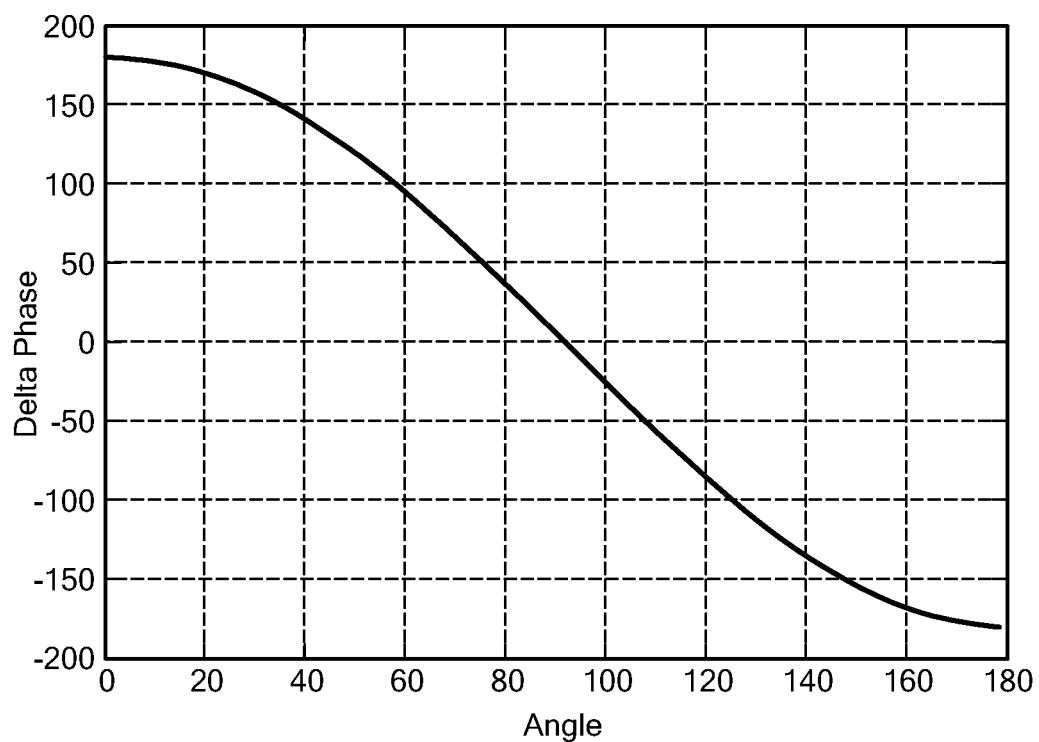
FIG. 1A is a plot of ideal phase difference vs. angle for the two-channel automotive radar system of FIG. 1.
Figure 1B:
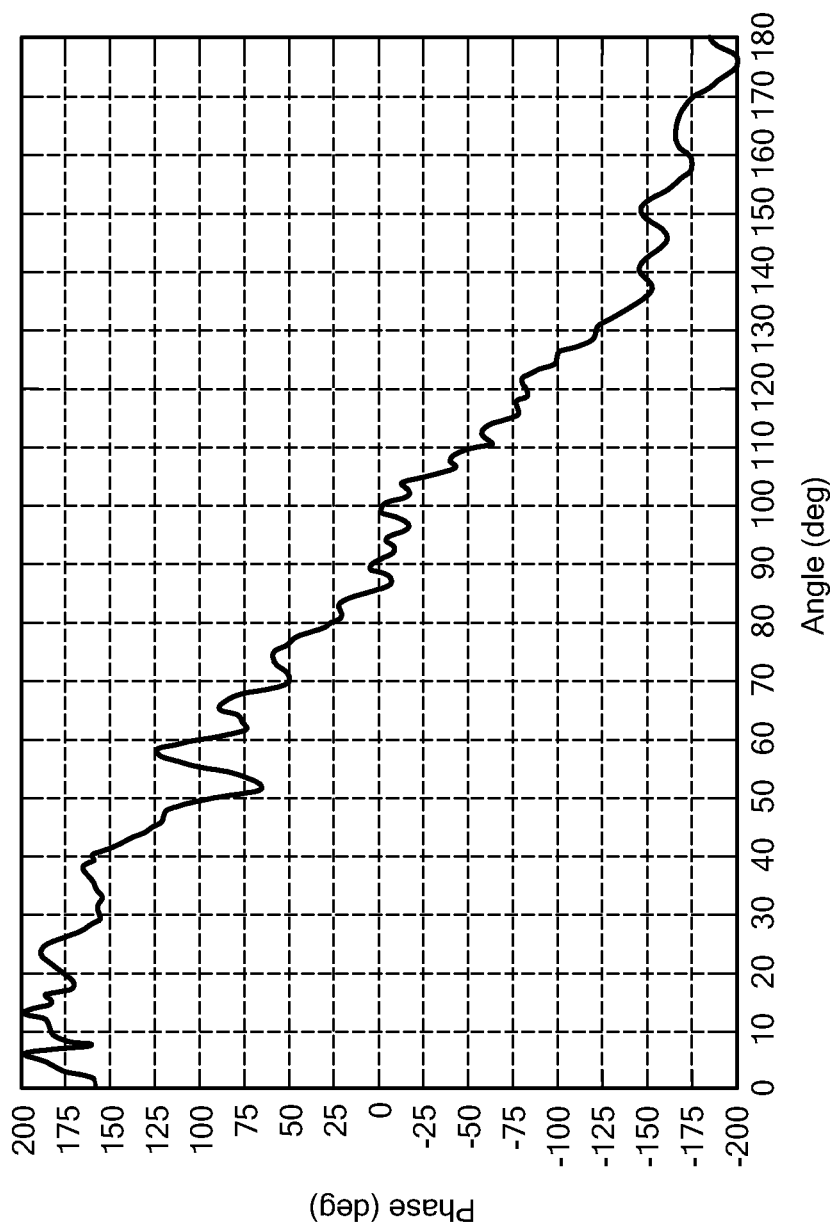
FIG. 1B is a plot of measured phase difference vs. angle for the two-channel automotive radar system of FIG. 1.

Referring now to FIG. 2A, a first one of the phase curves 40 corresponds to an unambiguous phase curve and a second one of the two phase curves 42 corresponds to a phase curve having a slope which is different than the slope of the first phase curve. In this illustrative example, the first phase curve 40 (i.e. unambiguous phase curve) is generated by using signals from the antennas spaced by $\lambda/2$ (e.g. such as that provided by antennas 22 and 24 of FIG. 2). It should be noted that the unambiguous phase curve substantially corresponds to the same phase curve as would be provided by a conventional two-channel system with $\lambda/2$ antenna spacing (such as the system of FIG. 1, for example). The second phase curve 42 is generated by using a pair of antenna spaced by $3\lambda/2$ (e.g. such as that provided by antennas 22 and 26 of FIG. 2). Since the phase curves 40, 42 have different slopes, the use of the two phase curves 40, 42 enables the system to provide unambiguous angle information over a 180° field of view (FOV).

Specifically, phase curve 42 (generated by the $3\lambda/2$ antenna spacing) has an azimuth angle resolution which is higher than phase curve 40. It should, of course be noted that phase curve 42 may itself, have ambiguities, Thus, phase curve 40 (generated by $\lambda/2$ antenna spacing) may be used to resolve ambiguities in the $3\lambda/2$ phase curve.

It has been found that utilizing two or more phase curves with at least one phase curve having a slope which is different from the slope of another phase curve, an automotive radar system which is less sensitive to physical placement and mounting (lower effective ripple) on a vehicle than conventional systems is provided. It should be noted that a spacing of $3\lambda/2$ produces three (3) times the slope of the $\lambda/2$ spacing. In addition, an effect related to the wider antenna spacing may result in the antenna being in a less coherent phase environment for reflections from the body. It has been found that utilizing two or more phase curves with at least one phase curve having a slope which is different from the slope of another phase curve, an automotive radar system which having better FOV performance is provided.

Figure 2B:
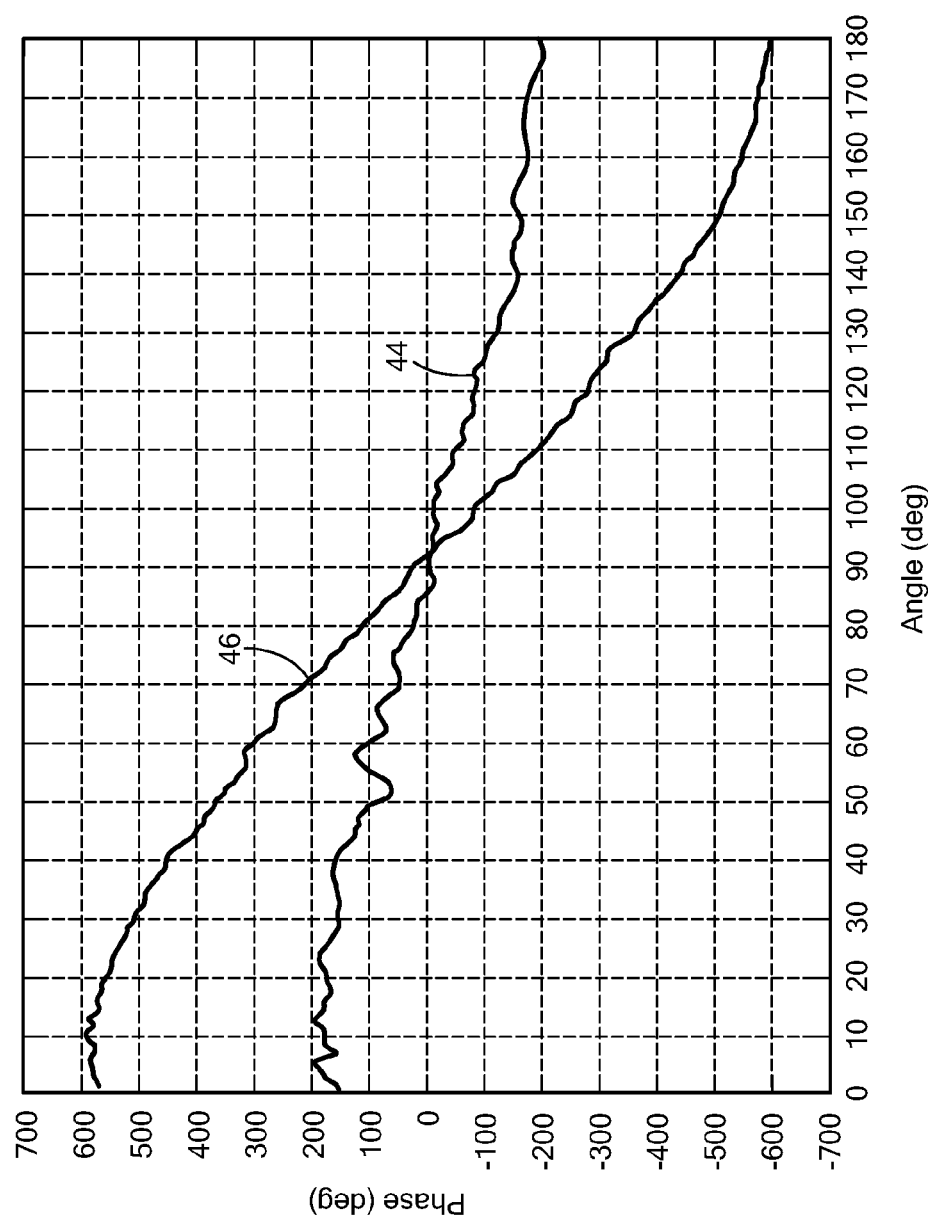
FIG. 2B is plot of measured phase difference vs. angle for a vehicle-mounted automotive radar system which utilizes a three channel switched antenna which may be the same as or similar to the system described in conjunction with FIG. 2.

Referring now to FIG. 2B, phase curves generated from measurements made in a vehicle-mounted automotive radar system are shown. Phase curve 44 corresponds to an unambiguous phase curve (i.e. phase curve generated with A/2 antenna spacing) and phase curve 46 corresponds to a phase curve generated with $3\lambda/2$ antenna spacing (it should be noted that phase curve 46 is "unwrapped").

Figure 3:
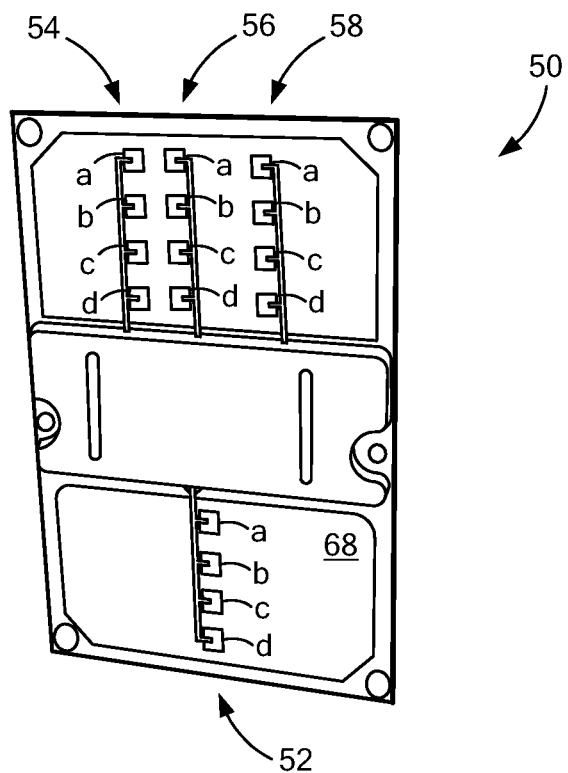
FIG. 3 is a perspective view of an automotive radar system which utilizes a three channel switched antenna which may be the same as or similar to the system shown in FIG. 2.

Referring now to FIG. 3, an automotive radar system 50 includes a transmit antenna, here provided from a linear array 52 of patch antenna elements 52a-52d. Radar system 50 also includes a receive antenna, here provided from three antennas 54, 56, 58. Significantly, antenna 54 is spaced from antenna 56 by a distance of $\lambda/2$ and antenna 58 is spaced from antenna 56 by a distance of $\lambda$ and spaced from antenna 54 by a distance of $3\lambda/2$.

In the illustrative embodiment of FIG. 3, each antenna 54, 56, 58 is shown provided as a linear array of patch antenna elements 54a-54d, 56a-56d, 58a-58d. It should, of course, be appreciated that antennas 54, 56, 58 need not be provided as array antennas for operation as a three channel switched antenna automotive radar system as described herein in conjunction with FIGS. 2-2B. It should also be appreciated that in the case where one or all of antennas 54, 56, 58 are provided as array antennas, they need not be provided as linear array antennas (e.g. one or all of antennas 54, 56, 58 may be provided as two-dimensional array antennas). Furthermore, the arrays may be provided from any type and number of antenna elements (i.e. any type of antenna element, including but not limited to patch antenna elements, may be used).

Thus, automotive radar system 50 utilizes a three channel switched antenna to improve the angular resolution of the system 50. Accordingly, automotive radar system 50 may operate as described above in conjunction with FIGS. 2-2B.

Figure 4:
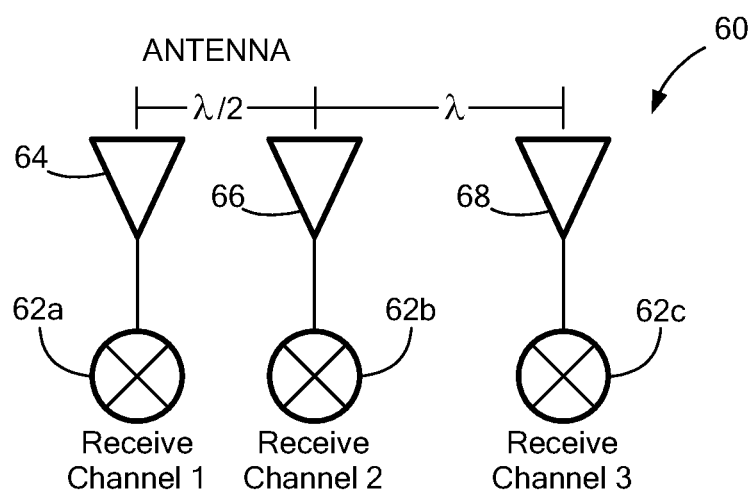
FIG. 4 is a block diagram of an automotive radar system having a three-channel receiver.

Referring now to FIG. 4, another embodiment of an automotive radar system which can achieve the same or similar results as the system described above in conjunction with FIG. 2 may use a receiver 60 having three or more channels 62a, 62b, 62c in place of the switched second channel as described above in conjunction with FIG. 2. Each receiver channel 62a, 62b, 62c receives signals from a respective one of antennas 64, 66, 68. This approach has the possibility of simultaneously process the added channels, but with added cost.

As will now be apparent from the description provided herein, the concepts, structures and techniques described herein can benefit any 24 GHz radar, especially those using wide Field of View (FOV) antenna designs. Furthermore, the concepts, structures and techniques described herein can be used in a wide variety of applications including, but not limited to blind spot detection, lane change, CTA, and park slot measurement.

Having described preferred embodiments which serve to illustrate various concepts, structures and techniques, which are the subject of this disclosure, it will now become apparent to those of ordinary skill in the art that other embodiments incorporating these concepts, structures and techniques may be used. For example, it should be noted that individual concepts, features (or elements) and techniques of different embodiments described herein may be combined to form other embodiments not specifically set forth above. Furthermore, various concepts, features (or elements) and techniques, which are described in the context of a single embodiment, may also be provided separately or in any suitable sub-combination. It is thus expected that other embodiments not specifically described herein are also within the scope of the following claims.

Thus, while particular embodiments of the concepts, systems and techniques described herein have been shown and described, it will be apparent to those skilled in the art that various changes and modifications in form and details may be made therein without departing from the spirit and scope of the invention as defined by the following claims.

Accordingly, the appended claims encompass within their scope all such changes and modifications.

We claim:

1. An azimuth tracking two-channel automotive radar system comprising:
 a first receive antenna;
 a second receive antenna spaced by a distance of $\lambda/2$ from said first antenna;
   a third receive antenna spaced from said second antenna by a distance of $\lambda$ and spaced from said first antenna by a distance of $3\lambda/2$;
   a switch having a first input port coupled to an output of said second receive antenna,
 a second input port coupled to an output of said third receive antenna and having an output port; and
   a two-channel radio frequency (RF) receiver having a first RF receiver channel having an input coupled to receive RF signals from said first receive antenna and having a second RF receiver channel having an input coupled to the output of said switch such that said second RF receiver channel selectively receives RF signals from said second and third receive antennas.

2. The automotive radar system of claim 1 wherein said first and second received channels comprises a down converter which receives RF signals provided there to from respective ones of the antennas and provides downconverted signals at outputs thereof.

3. The automotive radar system of claim 1 wherein said switch is provided as a single-pole, double-throw switch.

4. The automotive radar system of claim 1 wherein said first, second and third antenna are provided as array antennas.

5. The automotive radar system of claim 4 wherein said first, second and third antenna are provided as linear array antennas.

6. The automotive radar system of claim 5 wherein said first, second and third antenna are each provided from a linear array of patch antenna elements.

7. A method for operating an automotive radar system comprising an azimuth tracking two-channel radio frequency (RF) receiver, the method comprising:
 (a) generating a first set of phase values from a first channel of the two-channel RF receiver coupled to a first antenna;
 (b) generating a second set of phase values from a second channel of the two-channel RF receiver selectively coupled to a second antenna spaced by a distance of $\lambda/2$ from the first antenna;
 (c) generating a third set of phase values from the second channel of the two-channel RF receiver selectively coupled to a third antenna spaced by a distance of $3\lambda/2$ from the first antenna;
 (d) generating a first phase curve from the first and second set of phase values;
 (e) generating a second phase curve from the first and third set of phase values; and
 (f) comparing the phase values of the first phase curve to the phase values of the second phase curve to unambiguously resolve the phase and thereby improve the angular resolution of the automotive radar system.

8. The method of claim 7 further comprising:
 transmitting an RF signal from a transmit antenna;
 in response to the transmitted RF signal, receiving an RF return signal in a first receive antenna;
 in response to the transmitted RF signal, receiving an RF return signal in a second receive antenna spaced by a distance of $\lambda/2$ from the first antenna; and
 in response to the transmitted RF signal, receiving an RF return signal in a third receive antenna spaced by a distance of $3\lambda/2$ from the first antenna.

9. A method for operating an automotive radar system comprising an azimuth tracking two-channel radio frequency (RF) receiver, the method comprising:
 (a) transmitting an RF signal from a transmit antenna;
 (b) in response to the transmitted RF signal, receiving an RF return signal in a first receive antenna;
 (c) in response to the transmitted RF signal, receiving the RF return signal in a second receive antenna spaced by a distance of $\lambda/2$ from the first antenna;
 (d) in response to the transmitted RF signal, receiving the RF return signal in a third receive antenna spaced by a distance of $3\lambda/2$ from the first antenna;
 (e) providing the RF return signal received through the first receive antenna to a first channel of the two-channel RF receiver;
 (f) providing the RF return signal received through the second receive antenna to a first port of a switch;
 (g) providing the RF return signal received through the third receive antenna to a second port of a switch;
 (h) selectively providing the RF return signal received through the second receive antenna to a second channel of the two-channel RF receiver;
 (i) selectively providing the RF return signal received through the third receive antenna to the second channel of the two-channel RF receiver;
 (j) generating, in the first channel of the two-channel RF receiver, a first set of phase values from the RF return signal received via the first antenna;
 (k) generating a second set of phase values from a second channel of the two-channel RF receiver selectively coupled to the second antenna;
 (l) generating a third set of phase values from the second channel of the two-channel RF receiver selectively coupled to the third antenna;
 (m) generating a first phase curve from the first and second set of phase values; and
 (n) generating a second phase curve from the first and third set of phase values.

10. The method of claim 9 further comprising comparing the phase values of the first phase curve to the phase values of the second phase curve to unambiguously resolve the phase and thereby improve the angular resolution of the automotive radar system.

* * * * *